H. R. HILL.
WRENCH.
APPLICATION FILED OCT. 15, 1914.
1,163,407. Patented Dec. 7, 1915.
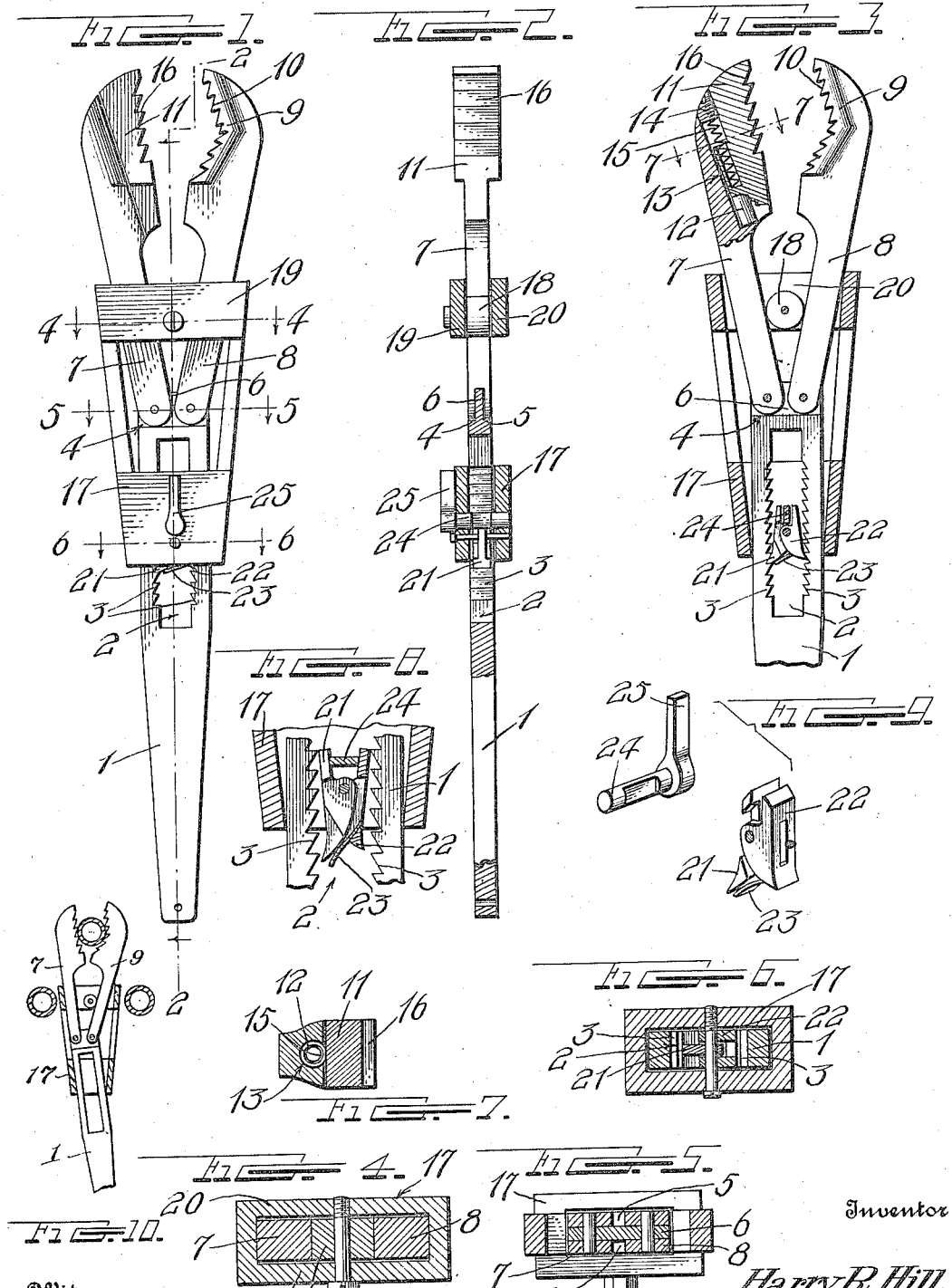

UNITED STATES PATENT OFFICE.

HARRY R. HILL, OF STILLWATER, MINNESOTA.

WRENCH.

1,163,407. Specification of Letters Patent. Patented Dec. 7, 1915.

Application filed October 15, 1914. Serial No. 866,611.

*To all whom it may concern:*

Be it known that I, HARRY R. HILL, a citizen of the United States, residing at Stillwater, in the county of Washington and State of Minnesota, have invented certain new and useful Improvements in Wrenches; and I do declare the following to be a full, clear, and exact description of the invention, such as will enable others skilled in the art to which it appertains to make and use the same.

My invention relates to improvements in wrenches, and has for its object to provide a device of this class which although being of comparatively simple and inexpensive construction, will be highly efficient and durable and may readily be applied to use on both round and polygonal objects, provision being made whereby the wrench may be applied to use in a number of places inaccessible for the use of other wrenches.

With the above object in view, the invention consists of certain novel features of construction, combination and arrangement of parts as will be hereinafter more fully described and claimed.

In the accompanying drawings: Figure 1 is a side elevation of a wrench constructed in accordance with this invention; Fig. 2 is a longitudinal section thereof taken on the line 2—2 of Fig. 1; Fig. 3 is a side elevation of the jaw carrying portion of the wrench with parts broken out; Fig. 4 is a transverse section taken on the line 4—4 of Fig. 1; Fig. 5 is a similar view taken on the line 5—5 of Fig. 1; Fig. 6 is a similar view taken on the line 6—6 of Fig. 1; Fig. 7 is a transverse section through the sliding jaw taken on the line 7—7 of Fig. 3; Fig. 8 is a detail sectional view showing the dogs in retracted position; Fig. 9 is a detail perspective view of the dog retracting lever and of the dogs. Fig. 10 is a diagram showing the manner in which the wrench may be used in a usually inaccessible place.

In the embodiment illustrated, a solid flat handle 1 is shown which preferably tapers toward its rear end and is provided with a longitudinally extending rectangular opening 2 which extends from the front end of the handle to a point near the center thereof and has the side walls thereof toothed for a portion of their length as shown at 3, said teeth extending forwardly for a purpose to be described. The front end of this handle 1 beyond the slotted portion thereof is reduced to provide shoulders 4 and 5 on its opposite faces and against which the shanks of the gripping jaws to be described are designed to abut. The reduced portion 6 of the handle is apertured to receive the ends of the shanks 7 and 8 of the gripping jaws, said ends being preferably bifurcated and straddling said reduced handle end as is shown clearly in Fig. 2. The shank 8 has a gripping face 9 formed integral therewith which is here shown inclined upwardly and outwardly for a portion of its length and then inwardly and forwardly to adapt it to conform to nuts or pipes to be gripped, said gripping face being provided with rearwardly inclined teeth 10 to facilitate the engagement of said jaw with the object to be operated on.

The shank 7 has a sliding jaw 11 mounted therein and which is here shown provided on its shank engaging face with an undercut tongue 12 which is designed to slide in an undercut groove 13 formed in the inner face of the outer or forward end of the shank 7 so that when the parts are assembled, a dovetailed connection is formed. A stop 14 is mounted in the outer or front end of the groove 13 and is preferably removable and against which is designed to abut a coiled spring 15 carried by the jaw 11, the tension of said spring being controlled by the extent of insertion of the stop or plug 14 which may be held in the groove by any suitable means. This spring 15 is designed to hold the sliding jaw against the pipe or nut with which the wrench is engaged during the screwing up or tightening action and when the handle is pulled back this sliding jaw 11 is released and thereby produces a ratchet-like movement.

As shown, the outer front end of the shank 7 is enlarged and the inner face thereof is inclined upwardly and coöperates with the correspondingly inclined rear face of the jaw 11, the inner gripping face of said jaw being straight and provided with outwardly extending teeth 16 which coöperate with the rearwardly extending teeth on the fixed jaw for reliably gripping the article to be turned.

A casing 17 is slidably mounted on the handle 1 and the shanks 7 and 8 of the gripping jaws and has rearwardly tapering sides forming a substantially truncated V-shaped member with the rear end thereof mounted on the handle and the front end on the shanks of the jaws. A roller 18 is revolubly mounted between two cross bars 19 and 20 which connect the front ends of the side members of the casing, said roller being disposed preferably about midway the length of said bars. The spaces between the periphery of this roller and the sides of the casing are substantially equal to the width of the shanks 7 and 8 which shanks slide in said spaces with the roller 18 disposed between them and engaging their inner edges so that when the casing 17 is retracted or moved rearwardly, this roller will force said shanks apart, thereby opening the jaws at the free ends thereof and when said casing is advanced or moved forwardly, the side members thereof will engage the outer edges of said shanks and move the jaws toward each other into closed or gripping position.

Mounted in the smaller rear end of the casing 17 is a pair of locking dogs 21 and 22 which are pivoted midway of their ends and have a spring 23 disposed between their engaging portions or biting points and which forces said biting points away from each other into engagement with the teeth 3 formed on the side walls of the slot 2 and when said dogs are engaged with these teeth, the casing 17 is locked in its adjusted position. Revolubly mounted between the other ends of these dogs is an operating or dog retracting member 24 here shown in the form of a flat rod which when disposed in one position, has no effect on the dogs but when turned with its edges in engagement with the adjacent faces of the dogs, forces their inner ends apart and thereby retracts or moves their biting ends toward each other against the tension of the spring 23 and thus disengages them from the teeth on the handle and permits the casing 17 to be moved longitudinally for opening the jaws. This operating member 24 extends through the casing 17 and has a lever or handle 25 secured thereto and by means of which said member is turned for controlling the dogs.

In the operation of this wrench, the jaws being in partially closed position as shown in Fig. 1 and the dogs in engagement with the teeth 3 on the handle 1, when it is desired to open the jaws for engaging an object to be turned, the lever 25 is turned, thereby turning the operating shank or spindle 24 to which it is fixed and bringing the wider portion thereof into engagement with the front ends of the dogs, thus forcing the biting ends of the dogs toward each other and away from the teeth 3 whereby the casing 17 is released and it may then be moved rearwardly on the handle 1 and shanks 7 and 8 of the jaws. This rearward movement of the casing forces the roller 18 between said shanks 7 and 8 and thus forces said shanks apart and opens the jaws. The jaws are then engaged with the nut or pipe to be operated on and the lever 25 is turned back into normal position which permits the dogs to spring apart and to engage the teeth on the opposite sides of the slot 2 in the handle 1. The casing is then moved forwardly and the tapered sides thereof engaging the outer edges of the shanks 7 and 8 force them toward each other and cause the jaws to tightly grip the nut to be turned, the dogs riding freely over the teeth 3. When the casing has been forced forwardly to the desired position, the dogs 21 and 22 will spring outwardly into engagement with the teeth 3 and lock said casing against accidental rearward movement such as would release the jaws and consequently said jaws are held thereby in locked engaging position. The spring 15 of the sliding jaw holds said jaw firmly against the nut and when the handle 1 is retracted or pulled backwardly, the sliding jaw releases, thus producing a ratchet motion.

A sliding frame 17 which moves on the handle 1 and shanks 7 and 8 is reliably held in adjusted position by two dogs and is capable of very minute adjustment, each dog moving one-sixteenth of an inch at each engagement with a tooth.

By reference more particularly to Fig. 3, it will be seen that the front end of the handle 1 projects loosely into the slide formed by the frame 17 and side bars 19 and 20 and that said front end is allowed an appreciable amount of lateral oscillation. This is very advantageous since if the wrench is applied to use in such a manner as to prevent the slide from moving laterally with the handle, as for instance as seen in Fig. 10 wherein the wrench has been inserted between two boiler tubes for the removal of another, said handle may nevertheless be oscillated. In other words, the handle may be moved first to the left, thus disposing its front end in contact with the right side of the slide and by so doing, the shank 8 is forced forwardly while the shank 7 is retracted. When now, the handle is moved to the right, its front end will of course travel oppositely, thereby projecting the shank 7 and retracting the shank 8. Continued oscillation of the handle will thus reciprocate the two shanks 7 and 8 and their jaws simultaneously in opposite directions.

By constructing the wrench in such a manner as to allow it to be operated in the manner above set forth, it will be obvious that it may be used in a number of places totally inaccessible for the application of other types of wrenches, it being obvious that as the jaws are reciprocated simultaneously in opposite directions, the teeth thereof will successively turn the pipe gripped thereby.

It may be well to here explain that during the oscillation of the handle in the manner above set forth, the spring 23 will yield the proper amount for allowing the necessary movement of the locking dogs 21 and 22.

I claim as my invention:

A wrench comprising an elongated slide open at its front and rear ends and having a pair of rearwardly converging side walls, a handle having its front end inserted into the rear end of the slide, the intermediate portion of said handle being disposed in contact with the rear end portions of the aforesaid side walls, and the front end of said handle being spaced from said walls whereby it may oscillate in the slide as the rear end of the handle is oscillated manually, a pair of longitudinally disposed jaw shanks inserted in the front end of the slide and having smooth outer edges contacting slidably with the front end portions of the aforesaid side walls, laterally spaced pivotal connections between the rear ends of the shanks and the front end of the handle, whereby oscillation of said end in the slide will reciprocate the two jaws simultaneously in opposite directions for the purpose specified, and means for holding the slide against longitudinal movement on the handle.

In testimony whereof I have hereunto set my hand in presence of two subscribing witnesses.

HARRY R. HILL.

Witnesses:
CHAS. E. HILL,
CHESTER S. WILSON.